US008778437B2

(12) United States Patent
Renes et al.

(10) Patent No.: US 8,778,437 B2
(45) Date of Patent: Jul. 15, 2014

(54) TASTE IMPROVING SUBSTANCES

(75) Inventors: Harry Renes, Lelystad (NL); Chris Winkel, Bussum (NL); Caroline De Lamarliere, Naarden (NL); Thorsten König, Amsterdam (NL); Esther Van Ommeren, Lelystand (NL); Sander Tondeur, Loosdrecht (NL)

(73) Assignee: Givaudan Nederland Services B.V., Huizerstraatweg (NL)

( * ) Notice: Subject to any disclaimer, the term of this patent is extended or adjusted under 35 U.S.C. 154(b) by 1589 days.

(21) Appl. No.: 11/578,846

(22) PCT Filed: Apr. 6, 2005

(86) PCT No.: PCT/NL2005/000262
§ 371 (c)(1),
(2), (4) Date: May 7, 2008

(87) PCT Pub. No.: WO2005/102071
PCT Pub. Date: Nov. 3, 2005

(65) Prior Publication Data
US 2009/0169696 A1    Jul. 2, 2009

(30) Foreign Application Priority Data

Apr. 20, 2004  (EP) .................................. 04076195
Apr. 26, 2004  (EP) .................................. 04076247
Dec. 24, 2004  (EP) .................................. 04078520

(51) Int. Cl.
*A23L 1/226*    (2006.01)

(52) U.S. Cl.
USPC ........................................................ 426/534

(58) Field of Classification Search
USPC ........................................................ 426/534
See application file for complete search history.

(56) References Cited

U.S. PATENT DOCUMENTS

| 5,780,090 | A  | 7/1998 | Frerot et al. |
| 2005/0013846 | A1 | 1/2005 | Pelan et al. |

FOREIGN PATENT DOCUMENTS

| EP | 1 252 825 A1 | 10/2002 |
| EP | 1 356 744 A1 | 10/2003 |
| EP | 1 473 287 A2 | 11/2004 |
| GB | 1 420 909 | 1/1976 |
| WO | 90/06689 A1 | 6/1990 |
| WO | 92/06601 A1 | 4/1992 |
| WO | 97/04667 A1 | 2/1997 |

OTHER PUBLICATIONS de Rijke, E., Ruisch, B.J., Bouter, N. König, T. 2006. "Liquid chromatography with accurate mass measurement on a triple quadripole mass-spectrometer for the identification and quantification of N-lacotyl ethanolamine in wine." Mol. Nutr. Food Res. vol. 50. pp. 351-355.*
Kolpan, S., Smith, B.H., Weiss, M.A. 1996. "Exploring Wine." John Wiley & Sons, Inc. New York. pp. 28-30, 434.*
Henderson, J.P., Rex, D. 2012. About Wine. 2nd Edition. Clifton Park, NY: Delmar. pp. 82-83.*
Ney, "Aromaintensivierende Wirkung von L-Glutamat und ahnlichen Verbindungen" (Flavour Enhancing Effect of L-Glutamate and Similar Compounds), Mitteilung aus dem Unilever Forschungslaboratorium Hamburg (BRD), Feb. 15, 1971, pp. 141-143, vol. 146, No. 3.
Velisek et al., "Succinic Acid in Yeast Autolysates and its Sensory Properties", Die Nahrung, 1978, pp. 735-743, vol. 22, No. 8, Prague Institute of Chemical Technology.
Yamasaki et al., "A Peptide with Delicious Taste", Agric. Biol. Chem., May 1, 1978, pp. 1761-1765, vol. 42, No. 9, Fukuoak, Japan.
Noguchi et al., "Isolation and Identification of Acidic Oligopepties Occurring in a Flavour Potentiating Fraction from a Fish Protein Hydrolysate", J. Agric. Food Chem., 1975, pp. 49-53, vol. 23, No. 1, Tokyo, Japan.
Cliff, M. et al., "Descriptive Analysis of Oral Pungency", Journal of Sensory Studies 7, Feb. 24, 1992, pp. 279-290, University of Missouri-Columbia, Columbia, MO.

* cited by examiner

*Primary Examiner* — Nikki H Dees
(74) *Attorney, Agent, or Firm* — The Webb Law Firm

(57) ABSTRACT

The present invention in a first aspect relates to taste improvement of foodstuffs, beverages, pharmaceutics, tobacco products and oral care products, using a substance according to formula (I) or formula (II), or edible salts thereof:

$$R^1-CR^7(OR^4)-CO-NR^2-CR^8R^3-X-OR^5 \quad (I)$$

$$R^6-CR^7(OR^4)-CO-Az \quad (II)$$

It was found that substances represented by formula (I) and/or formula (II) are capable of modulating and complementing the sensory impact of taste imparting substances. Thus, the present taste improving substances are advantageously applied in flavor compositions, foodstuffs, beverages, pharmaceutics, tobacco products and oral care products. Typical examples of flavor improving substances according to the present invention include N-lactoyl ethanolamine, N-lactoyl ethanolamine phosphate, N-α-hydroxy-butanoyl ethanolamine, N-lactoyl diethanolamine, N-lactoyl-2-amino-1,3-propanediol, N-lactoyl-3-amino-1,2-propanediol, N-lactoyl-3-amino-1-propanol, N-gluconyl-2-amino-1,3-propanediol, N-gluconyl-3-amino-1,2-propanediol, N-mannonyl ethanolamine, N-glycolyl ethanolamine, 2-hydroxyethyl-N-tartaramide, 2-hydroxyethyl-N-malamide, 2-hydroxyethyl-N-citramide and N-gluconyl-Az.

27 Claims, No Drawings

TASTE IMPROVING SUBSTANCES

FIELD OF THE INVENTION

The present invention concerns taste improvement in foodstuffs, beverages, pharmaceutics, tobacco products and oral care products. More particularly, the present invention provides flavour compositions that can be used to confer a fuller and richer taste to foodstuffs, beverages, pharmaceutics, tobacco products and oral care products. The flavour compositions according to the invention are characterised by the presence of one or more substances that are capable of modulating and complementing the impact of other flavour imparting substances.

The present invention also encompasses the use of the aforementioned taste improving substances for improving the taste of foodstuffs, beverages, pharmaceutics, tobacco products and oral care products, as well as to foodstuffs, beverages, pharmaceutics, tobacco products and oral care products containing these substances.

BACKGROUND OF THE INVENTION

"Umami" is a term commonly used to describe the taste impact of L-glutamate salts and certain nucleotides. Umami is the main taste in the Japanese stock called "dashi", and in bouillon and other stocks. Glutamic acid is an important constituent of food proteins (plant and animal) such as those abundantly found in foods such as meat, poultry, seafood and vegetables. Two nucleotides that contribute most to the umami taste, GMP (guanosine monophosphate) and IMP (inosine monophosphate) are also present in many foods. By themselves these nucleotides do not typically give as powerful a flavour result as MSG (monosodium glutamate). However, due to a synergistic interaction with MSG, a pronounced enhancing effect can be observed if these nucleotides are used in combination with MSG.

The umami taste has characteristic qualities that differentiate it from other tastes. It has been convincingly shown that umami represents the fifth taste, in addition to the other four basic tastes sweet, acid, salt and bitter. The most common descriptors that are used to describe the umami taste include "savoury", "meaty" and "broth-like". "Umami" is literally translated as "delicious".

There is a need for taste modulating systems that do not impart or enhance the typical savoury flavour notes in the way MSG does.

As alternatives to MSG and 5'-nucleotides, other molecules have been proposed as (umami-like) taste modulating substances:

Organic acids like tartaric and succinic acid have been reported to exhibit taste enhancing properties (Ney [1971] Z. Lebensm. Unters. Forsch. 146: 141; Velisek et al. [1978] Nahrung 22: 735). Taste modulating properties have also been attributed to certain di- to octa-peptides (Yamasaki and Maekawa [1978] Agric. Biol. Chem. 42: 1761; Noguchi et al. [1975] J. Agric. Food Chem. 23: 49).

WO 97/04667 discloses tripeptides containing a hydrophobic amino acid residue and at least one acidic amino acid residue as well as N-lactoyl-X substances, wherein X represents an amino acid residue, as flavouring ingredients to impart savoury taste and increase the mouthfeel of foodstuffs. It is also disclosed that these peptides and derivatives can partly mimic organoleptic features of MSG.

EP-A 1 252 825 discloses flavouring compositions for imparting umami taste to food products comprising substances that are formed by the reaction of the primary or secondary amino group of an amino acid, peptide or protein with the carbonyl group of a reducing sugar. According to this document the most preferred substances are those wherein the amino acid residue is selected from glutamic acid or aspartic acid and the sugar residue is selected from fructose, glucose, maltose, lactose, galactose, rhamnose, xylose and mannose.

EP-A 1 356 744 discloses flavouring compositions containing N-acetylglycine and the use thereof for imparting umami taste to foodstuffs.

As described above umami taste and umami imparting substances contribute to the flavour of foodstuffs, especially in the savoury range.

In sweet and beverage products, further examples of the importance of the gustative dimension of flavourings have been reported. These examples include taste attributes such as bitterness, tingling and cooling-freshness.

Bitterness is an essential aspect of some food flavours, among which chocolate taste. Purine alkaloids, like theobromine and caffeine, as well as amino acids and peptides have been known for a long time as bitter compounds. In British patent no. GB 1420909 it is disclosed that the bitter flavour of cocoa can be reproduced using a combination of a purine alkaloid and an amino acid or an oligopeptide which 'produces a surprisingly more natural simultaneously bitter and astringent flavour note than either of these types of substances alone'.

Menthol, an important constituent of peppermint oil, has a strong impact on flavoured products not only because of its mint smell but also because it imparts a cooling and fresh taste. Next to mint flavoured products, it has been suggested to employ menthol in other types of flavour to impart a cool taste. US patent application no. US2005013846 for example discloses how menthol and derivatives thereof can be used as flavouring in water continuous spreadable acidified food products to obtain table spreads exhibiting a fresh, cool taste impression.

Similarly, cinnamic aldehyde and eugenol, constituents of cinnamon oil, are used in flavouring composition for confectionary products, not only for their smell but also because they impart a warm and tingling taste. The oral pungency of cinnamic aldehyde was described as burning and tingling by Cliff M and Heymann H [Journal of Sensory Studies 7 (1992) 279-290]. According to the same authors eugenol exhibits a long-lasting numbing effect. Cinnamon oil has been proposed as a taste improving flavouring. International patent application no. WO9006689 discloses that cinnamon oil, among other spice extracts, added to a minty flavour formulation, can be used to improve the long-lasting flavour of chewing-gum.

Document no. EP1473287 discloses a range of alkyldienamides which can be used within flavouring composition to augment or impart flavour character such as fruity, umami taste, long-lasting taste, pungency, tingling, bitterness, fatty mouthfeel, freshness. Tingling effect was, among other applications, demonstrated on chewing gum prepared using N isobutyl E2, Z6-nonadienamide.

Although a lot of work has been focused on finding taste improving substances that are capable of imparting new exciting taste attributes, there still is a need for new taste improving substances, and in particular for taste improving substances with taste modulating properties that are suitable for use in both savoury and non-savoury applications.

SUMMARY OF THE INVENTION

The present inventors have surprisingly found that substances represented by the following formulae (I) and (II) can be used advantageously to improve the taste of foodstuffs, beverages, pharmaceutics, tobacco products and oral care products:

$$R^1—CR^7(OR^4)—CO—NR^2—CR^8R^3—X—OR^5 \quad (I)$$

$$R^6—CR^7(OR^4)—CO-Az \quad (II)$$

The present inventors found that the taste improving substances according to the present invention are particularly useful in a wide variety of applications including savoury food, non-savoury food, such as dairy, beverages and confectionery, as well as pharmaceutics, tobacco products and oral care products.

Therefore, the present invention relates to flavour compositions, foodstuffs, beverages, pharmaceutics, tobacco products and oral care products, comprising at least one substance according to formula (I) and/or at least one substance according to formula (II).

WO 92/06601 discloses certain amide based, non-caloric sugar substitutes derived from sugar carboxylic acids and amino alcohols, which possess similar physical rheological and colligative properties to sucrose. These substances may be used as sugar substitutes for formulated foods such as confectioneries, beverages, bakery products and the like, in order to simulate the structure, texture, freezing point depression, moisture retention, density, water solubility, solution viscosity properties, stability, non-reactivity and appearance characteristics of sucrose. Optionally these sugar substitutes may be used in combination with a high potency (artificial) sweetener, typical proportions thereof ranging from about 0.2 to 2.0 parts of sweetener per 100 parts of the sugar substitute. WO 92/06601 discloses a foodstuff (yellow cake) comprising 28.3 wt % of the sugar substitute.

Furthermore, the present invention relates to the use of the substances according to formula (I) or formula (II) for improving the taste of foodstuffs, beverages, pharmaceutics, tobacco products and oral care products, and to a process for improving the taste of the latter products.

The taste improving substances according to the present invention can be applied advantageously to impart desirable taste attributes to the aforementioned products. In addition, the present taste improving substances are capable of modulating the taste impact of other flavour ingredients contained within these same products, thereby improving the overall flavour quality of these products.

DETAILED DESCRIPTION OF THE INVENTION

Accordingly, the present invention in a first aspect relates to the use for improving the taste of foodstuffs, beverages, pharmaceutics, tobacco products or oral care products of a substance according to formula (I) or formula (II), or edible salts thereof:

$$R^1—CR^7(OR^4)—CO—NR^2—CR^8R^3—X—OR^5 \quad (I)$$

$$R^6—CR^7(OR^4)—CO-Az \quad (II)$$

wherein:
X represents a covalent bond; $C_1$-$C_5$ alkyl or $C_2$-$C_5$ alkenyl, each optionally substituted with 1-4 substituents selected from hydroxyl, $C_1$-$C_3$ alkyl and $C_1$-$C_3$ alkenyl;
$R^1$ and $R^7$ independently represent hydrogen; or $C_1$-$C_8$ alkyl, $C_2$-$C_8$ alkenyl or $C_3$-$C_8$ cycloalkyl, each optionally substituted with 1-8 substituents selected from hydroxyl, oxo, $C_1$-$C_3$ alkyl; $C_2$-$C_3$ alkenyl and $C_1$-$C_3$ carboxyl;
$R^2$ represents hydrogen; or $C_1$-$C_6$ alkyl, $C_2$-$C_6$ alkenyl, $C_3$-$C_6$ cycloalkyl $C_3$-$C_6$ cycloalkenyl or $C_1$-$C_6$ acyl, each optionally substituted with 1-6 substituents selected from hydroxyl, $C_1$-$C_3$ alkyl and $C_2$-$C_3$ alkenyl;
$R^3$ and $R^8$ independently represent hydrogen; hydroxyl; or $C_1$-$C_8$ alkyl, $C_2$-$C_8$ alkenyl, or $C_3$-$C_8$ cycloalkyl, each optionally substituted with 1-8 substituents selected from hydroxyl, $C_1$-$C_3$ alkyl and $C_2$-$C_3$ alkenyl;
$R^4$ represents hydrogen, $C_1$-$C_3$ acyl or $C_1$-$C_3$ alkyl;
$R^5$ represents hydrogen, $C_1$-$C_3$ acyl, $C_1$-$C_3$ alkyl, a phosphate group selected from mono-, di- and triphosphate or a $C_2$-$C_5$ carboxyacyl, optionally further substituted with 1-3 substituents selected from hydroxyl, oxo, $C_1$-$C_3$ carboxyl;
$R^6$ represents $C_2$-$C_6$ alkyl or $C_4$-$C_6$ cycloalkyl each optionally substituted with 1-6 hydroxyl groups and each optionally substituted with 1-4 substituents selected from $C_1$-$C_3$ alkyl and $C_1$-$C_3$ carboxyl;
and
Az represents an amino acid residue, and the CO-Az bond represents an amide bond;
provided that $R^1$—$CR^7(OR^4)$—CO— does not represent a hexose or heptose sugar acid residue comprising more than 4 hydroxyl groups.

More preferably, in said formulas X represents $C_1$-$C_5$ alkyl, $C_2$-$C_5$ alkenyl, each optionally substituted with 1-4 hydroxyl groups; $R^1$ and $R^7$ independently represent hydrogen; or $C_1$-$C_5$ alkyl or $C_2$-$C_5$ alkenyl each substituted with 1-5 substituents selected from hydroxyl, oxo and $C_1$-$C_3$ carboxyl; $R^2$ represents hydrogen; or $C_1$-$C_6$ alkyl, $C_2$-$C_6$ alkenyl or $C_1$-$C_6$ acyl, each substituted with 1-6 hydroxyl groups; $R^3$ and $R^8$ independently represent hydrogen, hydroxyl or $C_1$-$C_8$ alkyl or $C_1$-$C_8$ alkenyl, each substituted with 1-8 hydroxyl groups; $R^4$ represents hydrogen; $R^5$ represents hydrogen, a phosphate group selected from mono-, di-, and triphosphate or a $C_2$-$C_5$ carboxyacyl optionally further substituted with 1-3 substituents selected from hydroxyl, oxo, $C_1$-$C_3$ carboxyl; $R^6$ represents $C_2$-$C_5$ alkyl substituted with 1-5 substituents selected from hydroxyl and $C_1$-$C_3$ carboxyl; and AZ represents a proteogenic amino acid.

The present inventors have found that the substances defined here above are very useful ingredients which, particularly in the presence of other flavouring substances, are capable of imparting highly appreciated taste sensations to the products in which they are incorporated, specifically "roundness", "fullness", "substance", "transparency", "continuity", "tingling", "numbing", "bitter" and/or "metallic". Because of this, the present taste improving substances can be employed to improve the taste (including "mouthfeel") of foodstuffs, beverages, pharmaceutics, tobacco products and oral care products.

The taste improving substances of the present invention as such are capable of imparting highly desirable taste attributes. In addition, it has been found that the taste modulating substances according to the invention are capable of complementing and modulating the sensory impact of other flavouring substances contained in the aforementioned products, including complementing and modulating 'salty taste impact', 'acidic taste impact' and/or 'bitterness'.

Throughout this document the terms "taste" and "flavour" are used interchangeably to describe the sensory impact that is perceived via the mouth, especially the tongue, and the olfactory epithelium in the nasal cavity. The term "taste modulating" as used herein refers to the capability of a composition or substance to alter the taste impact of other, flavour imparting, substances present within the same product, with the proviso that this change in taste impact is not caused by the flavour contribution of said composition or substance per se, but instead that it mainly results from the combined effect of on the one hand the taste modulating composition or substance and on the other hand the other flavour imparting substances. The present substances combine the capability of modulating the taste of other flavour substances with a taste contribution of their own. The favourable impact of the present taste improving substances is believed to be the result of the combination of these two effects.

Because the taste improving substances according to the invention are not particularly volatile, they do not produce a strong aroma impact, even though they can affect the aroma impact of other flavour substances. Here the term "aroma" refers to the aspect of taste that is perceived through the olfactory epithelium. Because of the low volatility of the present taste improving substances it is believed that the advantageous properties of these substances are somehow associated with the impact that these substances have on the sensory receptors located within the mouth.

It was found that particularly satisfying results can be obtained with taste improving substances according to formula (I) and/or formula (II) wherein X represents a $C_1$-$C_4$ alkyl or $C_2$-$C_4$ alkenyl chain, each optionally substituted with 1-2 substituents selected from hydroxyl and $C_1$-$C_2$ alkyl. More preferably, X represents a $C_1$-$C_3$ alkyl chain, optionally substituted with hydroxyl or methyl. Even more preferably, X represents a $C_1$-$C_2$ alkyl chain, most preferably it represents methylene.

According to another preferred embodiment, $R^1$ represents $C_2$-$C_8$ alkyl or $C_4$-$C_6$ cycloalkyl, each substituted with 1-6 hydroxyl groups and/or 1-3 carboxyl groups. Even more preferably, $R^1$ represents $C_2$-$C_6$ alkyl, substituted with 2-6 hydroxyl groups. Most preferably, $R^1$ represents $C_3$-$C_5$ alkyl, substituted with 3-5 hydroxyl groups. Even more preferably in formula (I) and/or formula (II) $R^1$ represents $C_3$-$C_5$ alkyl wherein each carbon atom is substituted with a hydroxyl group and $R^7$ represents hydrogen.

Alternatively, $R^1$ and $R^7$ independently represent hydrogen or $C_1$-$C_4$ alkyl optionally substituted with 1-5 substituents selected from hydroxyl and oxo, even more preferably $R^1$ represents hydrogen, methyl, —$CH_2$—COOH, or —CHOH—COOH and $R^7$ represents hydrogen or —$CH_2$—COOH, such that the taste improving substances comprise primary amine derivatives of organic food acids, preferably organic food acids selected from lactic acid, malic acid, citric acid, glycolic acid and tartaric acid, more preferably tartaric acid and lactic acid.

In still another preferred embodiment $R^1$ represents $C_1$-$C_4$ alkyl, more preferably $C_1$-$C_2$ alkyl, most preferably methyl.

In the aforementioned formula (I) $R^2$ preferably represents hydrogen or $C_1$-$C_4$ alkyl, most preferably hydrogen. Likewise, $R^3$ preferably represents hydrogen or $C_1$-$C_3$ alkyl, most preferably it represents hydrogen.

Alternatively, it is preferred that $R^2$ represents $C_1$-$C_4$ alkyl substituted with 1-3 hydroxyl groups, more preferably $R^2$ represents 2-hydroxyethyl. In a particularly preferred embodiment $R^2$ represents 2-hydroxyethyl, X represents methyl and $R^3$ and $R^8$ represent hydrogen, such that the taste improving substances comprise one or more α-hydroxy carboxylic acid derivatives of diethanolamine.

In still another equally preferred embodiment $R^2$, $R^1$, $R^7$ and $R^4$ are chosen such that formula (I) represents a tertiary amine comprising two identical α-hydroxycarboxylic acid residues.

According to still another preferred embodiment of the invention X represents methylene, —CHOH—$CH_2$, or ethylene and $R^3$ and $R^8$ independently represent methyl, hydroxymethyl or hydrogen. In an even more preferred embodiment $R^3$, $R^8$ and X together comprise 2 carbon atoms such that the taste improving substances comprise α-hydroxy carboxylic acid derivatives of amino-propanols and amino-propanediols.

In formula (I), $R^4$ preferably represents hydrogen and $R^5$ preferably represents hydrogen, $C_1$-$C_3$ acyl $C_1$-$C_3$ alkyl or a phosphate group selected from mono-, di- and triphosphate, more preferably hydrogen or a phosphate group as defined above.

It was found that taste improving substances according to the present invention wherein $R^5$ represents a substituent that is easily deprotonated in aqueous media provide particularly satisfying results. Hence, according to an alternative embodiment $R^5$ represents a $C_2$-$C_5$ carboxyacyl, optionally substituted with optionally further substituted with 1-3 substituents selected from hydroxyl, oxo, $C_1$-$C_3$ carboxyl, such that monoesters of di and tricarboxylic acids are provided, preferably di- or tricarboxylic acids selected from fumaric acid, tartaric acid, malic acid, citric acid, and aconitic acid.

In formula (II) $R^6$ preferably represents a $C_2$-$C_6$ alkyl, substituted with 2-6 hydroxyl groups. More preferably, $R^6$ represents $C_3$-$C_5$ alkyl, substituted with 3-5 hydroxyl groups. Most preferably $R^6$ represents $CH_2OH$—$(CHOH)_q$, wherein q=2, 3 or 4, preferably 3.

In another preferred embodiment, $R^7$ and/or $R^8$ represent hydrogen. Most preferably, both $R^7$ and $R^8$ represent hydrogen.

In yet another preferred embodiment $R^1$—$CR^7(OR^4)$—CO— does not represent a hexose or heptose sugar acid residue.

The amino acid residue in the substance according to formula (II) is preferably a residue of an amino acid selected from the group consisting of glycine, alanine, methionine, proline, cysteine, tyrosine, asparagine, aspartic acid, glutamic acid, lysine, arginine and histidine, even more preferably the amino acid residue is selected from glycine, asparagines, aspartic acid and lysine.

Hence, according to a particularly preferred embodiment a flavour composition is provided comprising at least 0.1 wt. % of flavouring substances ad between 0.001 and 80 wt % of one or more taste improving substances according to formula (I) and/or formula (II) and/or edible salts thereof, wherein X represents $C_1$-$C_2$ alkyl, optionally substituted with a hydroxyl group; $R^1$ and $R^7$ independently represent hydrogen or $C_1$-$C_5$ alkyl substituted with 1-5 substituents selected from hydroxyl, oxo and $C_1$-$C_3$ carboxyl; $R^2$ represents hydrogen; or $C_1$-$C_6$ alkyl, $C_2$-$C_6$ alkenyl or $C_1$-$C_6$ acyl, each optionally substituted with 1-6 hydroxyl groups; $R^3$ and $R^8$ independently represent hydrogen or $C_1$-alkyl optionally substituted with a hydroxyl group; $R^4$ represents hydrogen; $R^5$ represents hydrogen, a phosphate group selected from mono-, di-, and triphosphate or a $C_2$-$C_5$ carboxyacyl optionally further substituted with 1-3 substituents selected from hydroxyl, oxo, $C_1$-$C_3$ carboxyl; and $R^6$ represents a proteogenic amino acid residue; with the provisio that $R^1$—$CR^7(OR^4)$—CO— does not represents a hexose or heptose sugar acid residue.

According to an even more preferred embodiment, the present taste improving substances comprise derivatives of sugar acids, preferably aldonic acids, and an amine selected from diethanolamine, proteogenic amino acids, amino-propanols and amino-propanediols; derivatives of an organic α-hydroxy carboxylic food acid and an amine selected from ethanolamine, diethanolamine, amino-propanols and amino-propanediols; edible salts thereof, phosphate esters thereof and di- and tri-carboxylic monoesters thereof.

In an even more preferred embodiment the present taste improving substances are selected from the group consisting of N-lactoyl ethanolamine, N-Lactoyl ethanolamine phosphate, N-α-hydroxy-butanoyl ethanolamine, N-α-hydroxy-butanoyl ethanolamine phosphate, N-lactoyl diethanolamine, N-lactoyl-2-amino-1,3-propanediol, N-lactoyl-3-amino-1,2-propanediol, N-lactoyl-3-amino-1-propanol, N-gluconyl-2-amino-1,3-propanediol, N-gluconyl-3-amino-1,2-propanediol, N-mannonyl ethanolamine, N-glycolyl ethanolamine, 2-hydroxyethyl-N-tartaramide, 2-hydroxyethyl-N-malamide, 2-hydroxyethyl-N-citramide and N-gluconyl-Az, wherein Az represents an amino acid residue.

In a most preferred embodiment the present taste improving substance is selected from the group of N-lactoyl ethanolamine, N-lactoyl ethanolamine fosfate, N-αhydroxy-butanoyl ethanolamine and N-gluconyl-Az, wherein Az represents an amino acid residue.

Another aspect of the invention relates to flavour compositions comprising at least 0.1 wt % of flavouring substances and one or more of the taste improving substances as defined herein before in an amount of at least 0.001 wt. %, preferably at least 0.01 wt. %. Most preferably, the flavour composition contains at least 0.1 wt. % of the present taste improving substances. Preferably the amount of the present taste improving substances does not exceed 80 wt. %, more preferably it does not exceed 40 wt. %. Here the term "flavouring substance" refers to any substance that is capable of imparting a detectable flavour impact, especially at a concentration below 0.1 wt. %, more preferably below 0.01 wt. %.

In a preferred embodiment the flavour composition according to the invention comprises flavouring substances in an amount of at least 0.5 wt. %, preferably at least 1 wt. %, based on the total weight of the composition.

Typically, in the present flavour composition the taste improving substances and flavouring substances as defined herein before are employed in a weight ratio within the range 10:1 to 1:100, preferably in a weight ratio of 5:1 to 1:50.

The flavour composition according to the present invention may suitably be prepared in the form of a liquid, a paste or a powder. In a particularly preferred embodiment the flavour composition is a free flowing powder.

Typical examples of flavour compositions according to the present invention include savoury flavourings, dairy flavourings, sour/acid flavourings, sweet flavourings and mint flavourings.

In one preferred embodiment flavouring compositions are provided comprising N-Lactoyl ethanolamine as well as a savoury flavouring, preferably a meat flavouring or a cheese flavouring.

In another preferred embodiment of the present invention flavouring compositions are provided comprising N-Lactoyl ethanolamine phosphate as well as a beverage flavouring, e.g. a citrus or cola flavouring or a dairy flavouring, e.g. a yoghurt flavouring.

In still another preferred embodiment flavouring compositions are provided comprising N-Lactoyl diethanolamine as well as a savoury flavouring, preferably a meat flavouring or a cheese flavouring.

In still another preferred embodiment flavouring compositions are provided comprising 2-hydroxyethyl-N-tartaramide as well as a savoury and/or sweet flavouring.

Yet another aspect of the present invention relates to a product selected from the group consisting of foodstuffs, beverages, pharmaceutics, tobacco products and oral care products, said product comprising at least 100 ppb, preferably at least 200 ppb, more preferably at least 500 ppb of one or more taste improving substances according to formula (I) and/or formula (II) and/or edible salts thereof. According to a particularly preferred embodiment said product contains at least 0.0001 wt. %, more preferably at least 0.0003 wt. %, even more preferably at least 0.001 wt. %, most preferably at least 0.003 wt. % of the one or more taste improving substances. Typically, the aforementioned products will contain the taste improving substances in a concentration of not more than 1 wt. %, preferably of not more than 0.5 wt. %.

Typical examples of foodstuffs according to the present invention include soups, sauces, stocks, bouillons, cheese products, dressings, seasonings, margarines, shortenings, bread, pastry, noodles, dairy products and beverages. The benefits of the present invention may also be realised in oral care products such a toothpaste and mouthwash. The term 'tobacco products', as used herein, refers to any type of tobacco product for smoking as well as non-smoking applications. It is furthermore noted that tobacco-like products are available for both smoking and non-smoking applications. The use of the present taste improving substances in tobacco substitutes is also encompassed by the present invention.

Yet another aspect the present invention relates to a process of improving the taste of a foodstuff, a beverage, a pharmaceutical product, a tobacco product or an oral care product, comprising adding to said foodstuff or oral care product one or more taste improving substances according to formula (I) and/or formula (II) and/or edible salts thereof, in an amount of at least 0.0003 wt. %, preferably of at least 0.001 wt. %.

The taste improving substances according to formula (I) are suitably produced by reacting a primary or secondary amine with an α-hydroxyl carboxylate. Taste improving substances according to formula (II) are suitably produced by reacting an amino acid with an α-hydroxyl carboxylate. Thus, yet another embodiment of the present invention relates to a process of producing a taste improving substance according to formula (I), comprising the step of reacting a substance according to formula (III) with an α-hydroxyl carboxylate or an α-hydroxyl carboxylate derivative according to formula (IV) or a salt of said carboxylate or derivative; and to a process of producing a taste improving substance according to formula (II) by reacting an amino acid with an α-hydroxyl carboxylate or an α-hydroxyl carboxylate derivative according to formula (V):

$$HNR^2\text{—}CR^8R^3\text{—}X\text{—}OR^5 \quad (III)$$

$$R^1\text{—}CR^7(OR^4)\text{—}COOR^9 \quad (IV)$$

$$R^6\text{—}CR^7(OR^4)\text{—}COOR^9 \quad (V)$$

or a salt of said carboxylate or derivative; wherein $R^1$, $R^2$, $R^3$ $R^4$, $R^5$, $R^6$, $R^7$ and $R^8$ have the same meaning as defined above in relation to formula (I) and (II); and wherein $R^9$ represents hydrogen or $C_1$-$C_3$ alky. The invention also encompasses reacting a substance according to formula (III) with a lactone that is formed by internal esterification of a substance according to formula (IV) wherein $R^1$ and/or $R^7$ contain a hydroxyl group; as well as reacting an amino acid with a lactone that is formed by internal esterification of a substance according to formula (V) wherein $R^6$ and/or $R^7$ contain a hydroxyl group. The present invention, in another embodiment, encompasses taste improving compositions obtainable by the processes described above, flavouring compositions comprising these and the use thereof for improving the taste of foodstuffs, beverages, pharmaceutics, tobacco products or oral care products.

The invention is further illustrated by means of the following examples.

EXAMPLES

Example 1

7 g of ethyl lactate was mixed with 3 g of ethanolamine and reacted at 120° C. for 4 hours. Excess of ethyl lactate was distilled off. NMR showed that the product was approximately 90% pure. 4 g of the product was dissolved in 6 g of water and the pH was adjusted to 5.5 with 50% NaOH. 10 g of this mixture was spray dried with 30 g maltodextrine. The spray dried sample was stored as such until tasting.

Example 2

N-Lactoyl ethanolamine phosphate was prepared by mixing 3 g lactic acid (containing 10 wt. % water) with 1 g of 2-aminoethylmonophosphate and reacted at 120° C. for 4 hours. 4 g of the reaction product was dissolved in 6 g of water and the pH was adjusted to 5.5 with 50% NaOH. Subsequently, 10 g of this mixture was spray dried with 30 g maltodextrine. The resulting sample was stored as such until tasting.

Example 3

A basic carbonated lemonade containing 10% sugar, 1200 ppm citric acid and 100 ppm ascorbic acid, was prepared. The pH of the lemonade was 3. This was used as the control. To the test lemonade the spray dried sample described in Example 2 was added in an amount of 0.03 wt. %. The two lemonades were compared by a panel.

The lemonade with N-lactoyl-ethanolaminie-phosphate was described as more acidic, more natural, more juicy, more complex.

Example 4

Three different tomato soup powder compositions were prepared by dry mixing the ingredients as given in table 1 (N-lactoyl ethanolamine added in the form of the reaction mixture described in Example 1).

TABLE 1

| Ingredients | A (Control) | B (50% Reduced salt) | C (Improved version) |
| --- | --- | --- | --- |
| Potato starch | 16.9 (g) | 16.9 (g) | 16.9 (g) |
| Tomato powder | 35 (g) | 35 (g) | 35 (g) |
| Sugar | 10 (g) | 10 (g) | 10 (g) |
| Fructose | 5 (g) | 5 (g) | 5 (g) |
| Milk powder | 20 (g) | 20 (g) | 20 (g) |
| Onion powder | 1.6 (g) | 1.6 (g) | 1.6 (g) |
| Garlic powder | 0.1 (g) | 0.1 (g) | 0.1 (g) |
| Carrot Powder | 0.1 (g) | 0.1 (g) | 0.1 (g) |
| MSG | 3.3 (g) | 3.3 (g) | 3.3 (g) |
| Yeast Extract | 1 (g) | 1 (g) | 1 (g) |
| Salt | 7 (g) | 3.5 (g) | 3.5 (g) |
| Maltodextrin | | 3.5 (g) | 2.5 (g) |
| Spray-dried product Example 1 | | | 1.0 (g) |
| Total | 100 (g) | 100 (g) | 100 (g) |

10 gram of each composition was mixed with 100 ml hot water to obtain tomato soups. The different soups were tasted and evaluated by a sensory panel. Product C, comprising N-lactoyl ethanolamine, was clearly preferred over product B (50% salt reduction). Despite the reduced salt content of product C, the perceived saltiness of the product was comparable to that of product A. Furthermore, the taste of product C was described as having "more taste", "more impact", "more umami", "more kokumi", and "salivating".

Example 5

Three aqueous solutions were prepared:
A. 0.5% NaCl

B. 0.5% N-lactoyl-ethanolamine-containing spray-dried product as described in example 1.
C. 0.5% NaCl and 0.5% N-lactoyl-ethanolamine-containing spray-dried product as described in example 1

The solutions were tasted by a sensory panel:
Solution A was described as: "salty".
Solution B was descried as: "weakly umami", "weakly brothy", "slightly salty", "salivating", "long-lasting".
Solution C was described as: "high impact", "bouillon", "meaty", "salty", "umami" and "salivating".

Example 6

Two different samples of vanilla flavoured UHT milk were prepared according to the recipes in table 2:

TABLE 2

| Ingredients | Vanilla flavoured milk A | Vanilla flavoured milk B |
| --- | --- | --- |
| Pasteurised half skimmed milk | 1000 g | 1000 g |
| Aspartam | 0.16 g | 0.16 g |
| Acesulfam | 0.16 g | 0.16 g |
| Vanilla flavour (NI) | 0.5 g | 0.5 g |
| Spray dried product obtained in Example 1 | 0 | 0.003 g |

Both products were evaluated by a sensory panel.
Sample A was described as: "vanilla", "sweet" and "bitter"
Sample B was described as: "vanilla", "sweet", "fatty", "more dairy", product B was preferred.

Example 7

Two different soft drinks A and B were prepared by adding respectively 250 ppb and 40 ppm of the spray-dried product obtained in example 1 to a commercially available carbonated orange flavoured soft drink.

A and B soft drinks were evaluated and compared to the original drink.

Sample A was judged as more natural, with a more juicy character than the original.

Sample B exhibited the tingling character typical of N-lactoyl ethanolamine, which was judged as very nice and particularly well suited for the orange flavour.

Example 8

Delta-glucono lactone (7.1 g; 40 mmol), alanine methyl ester hydrochloride (5.0 g, 40 mmol) and sodium hydroxide (1.6 g; 40 mmol) were mixed with 50 ml of ethanol. The mixture was heated at reflux temperature for 5 hours. The mixture was filtered while hot. The product N-gluconyl alanine methyl ester precipitated in the cooled ethanol. 2.8 gram of product was obtained after filtration. NMR showed the product to be 90% pure. Hydrolysis of the methyl ester was carried out in 10% trifluoro-acetic acid for 1 hour at 60° C. The solvents were removed in vacuo. Water was added three times to make sure that all trifluoro-acetic acid was removed. 2.2 g of N-gluconyl alanine was obtained.

Example 9

Three aqueous solutions were prepared:
D. 0.3% NaCl
E. 0.3% NaCl and 0.03% MSG
F. 0.3% NaCl, 0.03% MSG and 0.01% N-gluconyl alanine
The solutions were tasted by a sensory panel:

Solution A was described as: "salty".
Solution B was described as: "weakly umami", "weakly brothy", "slightly salty", "salivating", "long-lasting".
Solution C was described as: "bouillon", "salty", "umami", "bite of cheese", "salivating" and "long lasting effect of cheese".

The invention claimed is:

1. A flavour composition, comprising at least 0.1 wt. % of flavouring substances and between 0.001 and 80 wt. % of:
one or more first taste improving substances and optionally one or more second taste improving substances each independently according to formula (I) and/or edible salts thereof:

wherein:
X represents a covalent bond; $C_1$-$C_5$ alkyl or $C_2$-$C_5$ alkenyl, each optionally substituted with 1-4 substituents selected from hydroxyl, $C_1$-$C_3$ alkyl and $C_1$-$C_3$ alkenyl;
$R^1$ and $R^7$ independently represent hydrogen; or $C_1$-$C_8$ alkyl, $C_2$-$C_8$ alkenyl or $C_3$-$C_8$ cycloalkyl, each optionally substituted with 1-8 substituents selected from hydroxyl, oxo, $C_1$-$C_3$ alkyl; $C_1$-$C_3$ alkenyl and $C_1$-$C_3$ carboxyl;
$R^2$ represents hydrogen; or $C_1$-$C_6$ alkyl, $C_2$-$C_6$ alkenyl, $C_3$-$C_6$ cycloalkyl, $C_3$-$C_6$ cycloalkenyl or $C_1$-$C_6$ acyl, each optionally substituted with 1-6 substituents selected from hydroxyl, $C_1$-$C_3$ alkyl and $C_2$-$C_3$ alkenyl;
$R^3$ and $R^8$ independently represent hydrogen; hydroxyl; or $C_1$-$C_8$ alkyl, $C_2$-$C_8$ alkenyl or $C_2$-$C_8$ cycloalkyl, each optionally substituted with 1-8 substituents selected from hydroxyl, $C_1$-$C_3$ alkyl and $C_2$-$C_3$ alkenyl;
$R^4$ represents hydrogen, $C_1$-$C_3$ acyl or $C_1$-$C_3$ alkyl; and
$R^5$ represents hydrogen, $C_1$-$C_3$ acyl, $C_1$-$C_3$ alkyl, a phosphate group selected from mono-, di- and triphosphate, or a $C_2$-$C_5$ carboxyacyl optionally further substituted with 1-3 substituents selected from hydroxyl, oxo, $C_1$-$C_3$ carboxyl;
provided that $R^1$—$CR^7(OR^4)$—CO— does not represent a hexose or heptose sugar acid residue comprising more than 4 hydroxyl groups,
further provided that for said first taste improving substance, $R^5$ represents a phosphate group selected from mono-, di- and triphosphate, or a $C_2$-$C_5$ carboxyacyl optionally further substituted with 1-3 substituents selected from hydroxyl, oxo, $C_1$-$C_3$ carboxy.

2. The flavour composition according to claim 1, wherein $R^1CR^7(OR^4)$—CO— does not represent a hexose or heptose sugar acid residue.

3. The flavour composition according to claim 1, wherein for said second taste improving substance, $R^5$ represents hydrogen, $C_1$-$C_3$ acyl, or $C_1$-$C_3$ alkyl.

4. The flavour composition according to claim 1, wherein for said second taste improving substance, X represents $C_1$-$C_5$ alkyl, $C_2$-$C_5$ alkenyl, each optionally substituted with 1-4 hydroxyl groups;
$R^1$ and $R^7$ independently represent hydrogen; or $C_1$-$C_5$ alkyl, or $C_2$-$C_5$ alkenyl, each substituted with 1-5 substituents selected from hydroxyl, oxo and $C_1$-$C_3$ carboxyl;
$R^2$ represents hydrogen or $C_1$-$C_6$ alkyl, $C_2$-$C_6$ alkenyl or $C_1$-$C_6$ acyl, each substituted with 1-6 hydroxyl groups;
$R^3$ and $R^8$ independently represent hydrogen; hydroxyl; or $C_1$-$C_8$ alkyl or $C_1$-$C_8$ alkenyl, each substituted with 1-8 hydroxyl groups;
$R^4$ represents hydrogen; and
$R^5$ represents hydrogen.

5. The flavour composition according to claim 1, wherein for said second taste improving substance, X represents $C_1$-$C_2$ alkyl, optionally substituted with a hydroxyl group;
$R^1$ and $R^7$ independently represent hydrogen or $C_1$-$C_5$ alkyl substituted with 1-5 substituents selected from hydroxyl, oxo and $C_1$-$C_3$ carboxyl;
$R^2$ represents hydrogen; or $C_1$-$C_6$ alkyl, $C_2$-$C_6$ alkenyl or $C_1$-$C_6$ acyl, each substituted with 1-6 hydroxyl groups;
$R^3$ and $R^8$ independently represent hydrogen or $C_1$-$C_8$ alkyl substituted with 1 hydroxyl groups;
$R^4$ represents hydrogen; and
$R^5$ represents hydrogen.

6. The flavour composition according to claim 1, wherein independently for each of said first taste improving substance and said second taste improving substance, X represents $C_1$-$C_3$ alkyl, optionally substituted with hydroxyl or methyl.

7. The flavour composition according to claim 1, wherein independently for each of said first taste improving substance and said second taste improving substance, $R^1$ and $R^7$ independently represent hydrogen or $C_1$-$C_4$ alkyl optionally substituted with 1-5 substituents selected from hydroxyl and oxo.

8. The flavour composition according to claim 7, wherein independently for each of said first taste improving substance and said second taste improving substance, $R^1$ represents hydrogen, methyl, —$CH_2$—COOH, or —CHOH—COOH and $R^7$ represents hydrogen or —$CH_2$—COOH.

9. The flavour composition according to claim 7, wherein independently for each of said first taste improving substance and said second taste improving substance, $R_1$ represents $C_1$-$C_4$ alkyl.

10. The flavour composition according to claim 1, wherein independently for each of said first taste improving substance and said second taste improving substance, $R_1$ consists of $C_2$-$C_8$ alkyl substituted with 1-6 hydroxyl groups and/or 1-3 carboxyl groups; or a $C_4$-$C_6$ cycloalkyl, substituted with 1-6 hydroxyl groups and/or 1-3 carboxyl groups.

11. The flavour composition according to claim 10, wherein independently for each of said first taste improving substance and said second taste improving substance, $R_1$ represents $C_3$-$C_5$ alkyl, substituted with 3-5 hydroxyl groups.

12. The flavour composition according to claim 11, wherein independently for each of said first taste improving substance and said second taste improving substance, $R_1$ represents $C_3$-$C_5$ alkyl, wherein each carbon atom is substituted with a hydroxyl group, and wherein $R^7$ represents hydrogen.

13. The flavour composition according to claim 1, wherein independently for each of said first taste improving substance and said second taste improving substance, $R^2$ represents hydrogen or $C_1$-$C_4$ alkyl substituted with 1-3 hydroxyl groups.

14. The flavour composition according to claim 1, wherein independently for each of said first taste improving substance and said second taste improving substance, $R^2$ represents hydrogen or $C_1$-$C_4$ alkyl.

15. The flavour composition according to claim 1, wherein independently for each of said first taste improving substance and said second taste improving substance, $R^2$ represents hydrogen.

16. The flavour composition according to claim 1, wherein independently for each of said first taste improving substance and said second taste improving substance, $R^2$ represents 2-hydroxyethyl, X represents methylene and $R^3$ and $R^8$ represent hydrogen.

17. The flavour composition according to claim 1, wherein independently for each of said first taste improving substance and said second taste improving substance, X represents methylene, —CHOH—CH$_2$, or ethylene and R$^3$ and R$^8$ independently represent methyl, hydroxymethyl or hydrogen.

18. The flavour composition according to claim 1, wherein independently for each of said first taste improving substance and said second taste improving substance, R$^3$ represents hydrogen or C$_1$-C$_3$ alkyl.

19. The flavour composition according to claim 1, wherein independently for each of said first taste improving substance and said second taste improving substance, R$^3$ represents hydrogen.

20. The flavour composition according to claim 1, wherein for said second taste improving substance R$^5$ represents hydrogen.

21. The flavour composition according to claim 1, wherein independently for each of said first taste improving substance and said second taste improving substance, R$^7$ and R$^8$ represent hydrogen.

22. The flavour composition according to claim 1, wherein said first taste improving substance is N-lactoyl ethanolamine phosphate, and the second taste improving substance is selected from the group of N-lactoyl ethanolamine, N-α-hydroxy-butanoyl ethanolamine, N-lactoyl diethanolamine, N-lactoyl-2-amino-1,3-propanediol, N-lactoyl-3-amino-1,2-propanediol, N-lactoyl-3-amino-1-propanol, N-gluconyl-2-amino-1,3-propanediol, N-gluconyl-3-amino-1,2-propanediol, N-mannonyl ethanolamine, N-glycolyl ethanolamine, 2-hydroxyethyl-N-tartaramide, 2-hydroxyethyl-N-malamide, and 2-hydroxyethyl-N-citramide.

23. The flavour composition according to claim 1, wherein the first taste improving substance is N-lactoyl ethanolamine phosphate, and the second taste improving substance is selected from the group of N-lactoyl ethanolamine, and N-α-hydroxy-butanoyl ethanolamine.

24. A method for improving the taste of foodstuffs, beverages, pharmaceutics, tobacco products or oral care products, comprising adding one or more taste improving substances according to formula (I) as defined in claim 1 to said foodstuffs, beverages, pharmaceutics, tobacco products or oral care products.

25. A product selected from the group consisting of foodstuffs, beverages, pharmaceutics, tobacco products and oral care products, comprising at least 3 ppm of one or more taste improving substances according to formula (I) as defined in claim 1 and/or edible salts thereof.

26. A product selected from the group consisting of foodstuffs, beverages, pharmaceutics, tobacco products and oral care products, comprising at least 10 ppm of one or more taste improving substances according to formula (I) as defined in claim 1 and/or edible salts thereof.

27. A process of producing a taste improving substance according to formula (I) as defined in claim 1, comprising reacting a substance according to formula (III) with an α-hydroxyl carboxylate or an α-hydroxyl carboxylate derivative according to formula (IV) or a salt of said carboxylate or derivative;

$$HNR^2—CR^8R^3—X—OR^5 \qquad (III)$$

$$R^1—CR^7(OR^4)—COOR^9 \qquad (IV)$$

or a salt of said carboxylate or derivative; wherein R$_1$, R$^2$, R$^3$, R$^4$, R$^5$, R$^7$ and R$^8$ have the same meaning as defined in claim 1 and wherein R$^9$ represents hydrogen or C$_1$-C$_3$ alkyl.

* * * * *

UNITED STATES PATENT AND TRADEMARK OFFICE
CERTIFICATE OF CORRECTION

PATENT NO. : 8,778,437 B2  Page 1 of 2
APPLICATION NO. : 11/578846
DATED : July 15, 2014
INVENTOR(S) : Harry Renes et al.

It is certified that error appears in the above-identified patent and that said Letters Patent is hereby corrected as shown below:

Title Page, item (75) Inventors, Column 1, Line 5, delete "Lelystand (NL);" and insert -- Lelystad (NL); --

Title Page, Column 2, References Cited, Other Publications, Line 2, delete "quadripole" and insert -- quadrupole --

Title Page, Column 2, References Cited, Other Publications, Line 4, delete "N-lacotyl" and insert -- N-lactoyl --

Title Page, Column 2, References Cited, Other Publications, Line 19, delete "Fukuoak," and insert -- Fukuoka, --

Title Page, Column 2, References Cited, Other Publications, Line 20, delete "Oligopepties" and insert -- Oligopeptides --

In the Claims

Column 12, Line 10, Claim 5, delete "1 hydroxyl" and insert -- 1-8 hydroxyl --

Column 12, Line 29, Claim 9, delete "$R_1$" and insert -- $R^1$ --

Column 12, Line 33, Claim 10, delete "$R_1$" and insert -- $R^1$ --

Column 12, Line 39, Claim 11, delete "$R_1$" and insert -- $R^1$ --

Column 12, Line 43, Claim 12, delete "$R_1$" and insert -- $R^1$ --

Signed and Sealed this
Twenty-seventh Day of January, 2015

Michelle K. Lee
*Deputy Director of the United States Patent and Trademark Office*

Column 14, Line 1, Claim 23, delete "ethanolamine," and insert -- ethanolamine --

Column 14, Line 28, Claim 27, delete "$R_1$," and insert -- $R^1$, --